United States Patent [19]

Vogelesang et al.

[11] Patent Number: 4,992,323
[45] Date of Patent: Feb. 12, 1991

[54] LAMINATE OF METAL SHEETS AND CONTINUOUS FILAMENTS-REINFORCED THERMOPLASTIC SYNTHETIC MATERIAL, AS WELL AS A PROCESS FOR THE MANUFACTURE OF SUCH A LAMINATE

[75] Inventors: Laurens B. Vogelesang, Nieuwkoop; Leendert G. Meyers, Den Bommel; Tom M. van Velze, Delft, all of Netherlands

[73] Assignee: Akzo NV, Arnhem, Netherlands

[21] Appl. No.: 255,432

[22] Filed: Oct. 11, 1988

[30] Foreign Application Priority Data

Oct. 14, 1987 [NL] Netherlands ..................... 8702452

[51] Int. Cl.⁵ .................... B32B 7/02; B32B 15/08
[52] U.S. Cl. .............................. 428/215; 428/246; 428/419; 428/457; 428/458; 428/473.5; 428/474.4
[58] Field of Search ............ 428/458, 474.4, 113, 428/461, 911, 215, 473.5, 457, 419, 246

[56] References Cited

U.S. PATENT DOCUMENTS

| 4,489,123 | 12/1984 | Schijve et al. | 428/458 X |
| 4,500,589 | 2/1985 | Schijve et al. | 428/474.4 |
| 4,732,803 | 3/1988 | Smith, Jr. | 428/113 X |
| 4,836,084 | 6/1989 | Vogelesang et al. | 428/911 X |

FOREIGN PATENT DOCUMENTS

| 0013146 | 1/1982 | European Pat. Off. | |
| 2447272 | 8/1980 | France | 428/469 |
| 1303301 | 2/1973 | United Kingdom | 428/457 |

Primary Examiner—Thomas J. Herbert
Attorney, Agent, or Firm—Stevens, Davis, Miller & Mosher

[57] ABSTRACT

Fatigue resistant laminate which may be used at temperatures >120° c., and more particularly in the construction of (air or space) vehicles. It comprises at least two metal plates interconnected by an intermediate layer of thermoplastic material reinforced by continuous filaments having a modulus of elasticity of at least 50 GPa, the laminate displaying, while externally unloaded, a compressive stress (of 0–200 MPa) in every metal plate and a tensile stress (of 0–500 MPa) in the continuous filaments. The filaments may consist of aramid, glass or carbon. The thermoplastic material may be an amorphous resin having a Tg>140° C. such as, e.g., polyarylates, poly(ether)sulphones, polyetherimides, or poly-p-phenylene ethers, or a semi- or para-crystalline resin having a crystalline melting point>170° C., such as poly-phenylene sulphides, polyetherketones or liquid crystal polymers.

18 Claims, 2 Drawing Sheets

LAMINATE OF METAL SHEETS AND CONTINUOUS FILAMENTS-REINFORCED THERMOPLASTIC SYNTHETIC MATERIAL, AS WELL AS A PROCESS FOR THE MANUFACTURE OF SUCH A LAMINATE

The invention relates to a laminate composed of at least two small sheets, between which there is provided a thermoplastic synthetic layer containing fibres having a high modulus of elasticity, which layer is bonded to the metal sheets.

A laminate of this type and the process of manufacturing same is known from EP No. 0 013 146-B$_1$. This known laminate always comprises two relatively thin metal sheets laminated to each side of a much thicker core layer of thermoplastic synthetic material. In fact, the synthetic core layer has a thickness which is several times that of each metal layer, EP No. 0 013 146 particularly relates to a development which is to be substituted for conventional all-metal sheet material for automobile bodies. One of the most important requirements for sheet metal of cars is that the material should be highly and readily deformable. For that reason the known laminate is provided with a thick thermoplastic layer between two thin metal sheets leading to the desired ready deformation of the known laminate. Page 19 of EP No. 0 013 146-B$_1$ teaches that the thermoplastic synthetic material may contain modifying agents in the form of fillers or high modulus fibres, such as fibres of glass, carbon, aromatic polyamides, boron, steel, and the like. In order to permit the required high deformation of the known laminate during the manufacture of automobile body panels, the fibres that may be used as modifying agents will be present in the known laminate in the form of short, discontinuous fibres. Though the known laminates may reasonably comply with the standards to be met for said uses as regards high deformation, e.g. during the manufacture of automobile body panels, the known laminates are insufficiently capable of meeting the high demands made of late on structural components in air- and spacecraft engineering. In addition, the laminate described in EP No. 0 013 146 is directed to the use of a core layer of semi-crystalline thermoplastic polyamides and polyesters having a crystalline melting point above 130° C. This means that during the manufacture of the known laminate the several layers have to be compressed at a processing temperature above 130° C. and subsequently cooled to room temperature. At a temperature above 130° C. the use of some metals, for instance aluminum alloys, might be expected to lead to problems because of a deterioration of the mechanical properties along with the development of unfavorable residual stresses in the completed laminate as a result of differences in coefficient of expansion, particularly at the higher processing temperatures.

It should be noted that EP-B$_1$-0 056 288 describes a laminate of a different type composed of metal sheets between which there is provided a layer of a thermosetting synthetic material reinforced with continuous filaments of aromatic polyamide. In fact, it is proposed in it that unfavourable internal residual stresses be removed by pre-stressing the completed laminate, such that in the metal sheets of the laminate in its externally entirely unloaded state there prevails a compressive stress and in the reinforcement filaments a tensile stress. Although particularly favorable results may be obtained when employing these known laminates, they are less suited for uses requiring an operating temperature above 120° C. for lengthy periods of time.

The invention has for its object to provide a laminate of the type mentioned in the opening paragraph which no longer displays the drawbacks of the known laminates comprising a metal layer laminated to each side of a thermoplastic synthetic layer. The laminate according to the invention is characterized in that the fibres consist of continuous filaments having a modulus of elasticity of at least 50 GPa, and in the pre-stress direction in each metal sheet of the substantially flat laminate in its externally entirely unloaded state there prevails a compressive stress in the range of 0–200 MPa and in the continuous filaments a tensile stress in the range of 0–500 MPa.

A laminate which may in addition be suitable for applications subject to high service temperatures of, say, 140° C. for lengthy periods of time is characterized according to the invention in that the synthetic material is a virtually amorphous thermoplastic synthetic material having a glass transition temperature $T_g$ of at least 80° C., more particularly above 130° or 140° C., preferably above 160° C., such as polyarylate (PAR), polysulphone (PSO), polyethersulphone (PES), polyetherimide (PEI), or polyphenylene ether (PPE), more particularly poly-2,6 dimethyl phenyl ether. Another laminate suitable for use at high service temperatures is characterized according to the invention in that the synthetic material is a semicrystalline or para-crystalline thermoplastic synthetic material having a crystalline melting point $T_m$ of at least 130° C., more particularly above 170° C., preferably above 270° C., such as polyphenylene sulphide (PPS) polyamide-4,6, polyketone sulphide (PKS), polyether ketones, more particularly polyether-ether ketone (PEEK), polyether ketone (PEK), and polyether ketone-ketone (PEKK), or liquid crystal polymers such as XYDAR of Dartco composed of the monomers bisphenol, terephthalic acid, and hydroxybenzoic acid. According to the invention favorable results are also expected using a synthetic material in the form of a thermoplastic aramid having a glass transition temperature higher than 130° C.

A favorable embodiment of the laminate is characterized according to the invention in that the filaments, which preferably have an elongation at rupture higher than 1% and a modulus of elasticity of 60–250 GPa constitute 35–75% by volume, more particularly 40–65% by volume of the total volume of synthetic material and filaments combined, the synthetic layer being composed of one or more layers of plastics-impregnated filaments, the filament layers being provided on either side with a synthetic boundary layer contacted by the metal sheets and bonded thereto, which boundary layers contain virtually no, or at any rate far fewer filaments than the core layer. The laminate according to the invention is with advantage characterized in that the filaments consist of a material selected from the following group of high modulus materials: aramid, more particularly polyparaphenylene terephthalamide (PPDT), glass, more particularly E-glass or S$_2$-glass, polyethylene, and carbon. The properties of several of these reinforcing filaments are described in a paper by Kh. Hillermeier and H. G. Weijland, "An aramid yarn for reinforcing plastics", Plastica, November 1977, No. 11, pp. 374–380. S$_2$-glass filaments by and large have the same properties and composition as S-glass. The properties and composition of E-glass and S or S₂-glass are listed in the table on p. 29 of K. L. Loewenstein's book, The Manufacturing Technology of continuous glass fibres, Elsevier Scientific Publishing Company, 1973. It is preferred that the laminate according to the invention should be characterized in that the metal sheets are made of a metal which has a tensile strength higher than 0.20 GPa, preferably higher than 0.35 GPa and is selected from the following group of materials: aluminium alloys, more particularly aluminium-copper alloys, e.g. of the AA(U.S.A.) No. 2024 type or aluminium-zinc alloys, e.g. of the AA(U.S.A.) No. 7075 type, steel, and titanium alloys.

A preferable embodiment of the laminate is characterized according to the invention in that the metal sheets each have a thickness of less than 1.5 mm, more particularly of 0.1–0.8 mm, and the number of metal sheets is in the range of 2 to 20, the diameter of the filaments being 5–25 $\mu$m, more particularly 8–12 $\mu$m, and the continuous filaments extend parallel to each other in at least one direction and essentially linearly. Optimum results may be attained when use is made of a laminate which is characterized according to the invention in that the fibres consist of continuous filaments of aramid, more particularly PPDT, or of glass, having a modulus of elasticity of 60 to 200 GPa and an elongation at rupture of 1.5–6%, and the metal sheets are made of an aluminium alloy and have a thickness of 0.1–0.8 mm, and the thermoplastic synthetic material is selected from the following group of materials: amorphous thermoplastic synthetic materials having a $T_g > 140°$ C., such as PAR, PSO, PES, PEI, and PPE, and semicrystalline or para-crystalline synthetic materials having a crystalline melting point $T_m > 270°$ C., such as PPS, PEEK, PEK, PEKK, and liquid crystal polymers, and that in the pre-stress direction in each metal sheet of the completed laminate in its externally entirely unloaded state there prevails a compressive stress in the range of 0–200 MPa and in the aramid or glass filaments in the pre-stress direction there prevails a tensile stress in the range of 0–500 MPa.

A process for the manufacture of the laminate according to the invention, in which at least two metal sheets, between which there is provided a thermoplastic synthetic layer containing fibres having a high modulus of elasticity, are bonded together by applying external pressure and heating to a temperature of at least 100° C. followed by cooling, is characterized according to the invention in that a heating temperature of at least 170° C. is applied, and the fibres consisting of continuous filaments which extend parallel to each other in the synthetic layer are subjected to a tensile load imparting such an elastic elongation to the filaments by deformation that after the removal of the external load there remains in the externally entirely unloaded laminate a residual tensile stress in the filaments and there is a compressive stress in the metal sheets. A preferable process is characterized according to the invention in that after bonding together the metal sheets and the filaments-containing synthetic layer(s), particularly after cooling, an external deformation is imposed on the laminate in its entirety such that there is imparted to it an elongation which is greater than the elastic elongation of the metal sheets and smaller than the elongation at rupture of the filaments and the metal sheets, such that while the external tensile force is applied, the metal sheets are subject to plastic deformation. It is preferred according to the invention that an external deformation of such magnitude should be imposed on the laminate in its entirety that the resulting elongation of the laminate will be 0.2 to 3%, more particularly 0.4–1.5%. The process according to the invention is with advantage characterized in that prior to the bonding together of the different layers the laminate is pre-heated, more particularly over a period of 1–5 minutes, to a temperature of at least 170° C. practically without any external pressure being applied to the laminate, and the laminate is next compressed at the processing temperature of the thermoplastic synthetic material used, and the laminate is then cooled while said pressure is maintained, and the laminate is subsequently so pre-stressed that in the metal sheets of the completed laminate in its externally entirely unloaded state there prevails a compressive stress in the pre-stress direction and in the filaments a tensile stress.

Surprisingly, it has been found that in the completed laminate according to the invention there occurs no degradation of the mechanical properties of the metal sheets. Indeed, it has been found with some metals that the properties of the metal sheets in the completed laminate are more favorable than they were in the original state of the metal sheets prior to the manufacture of the laminate. This improvement applies in particular when use is made of metal sheets of the aluminium-copper alloy of the AA(U.S.A.) No. 2024-T₃ type as starting material in combination with thermoplastic synthetic material layers of PEI and continuous reinforcement filaments of aramid. Surprisingly, it has been found that in the completed laminate the sheets of said aluminium alloy display more favorable properties and, e.g., have greater strength and greater hardness.

In the completed laminate according to the invention there prevails an optimum state of internal stress, viz. compressive stresses in the metal sheets and tensile stresses in the filaments, which means that the laminate according to the invention is pre-stressed. It has been found that if the laminate was not pre-stressed in accordance with the invention, particularly when use is made of thermoplastic synthetic materials having a processing temperature above 170° C., there would arise in it an extemely unfavorable state of residual stress with tensile stresses prevailing in the metal sheets and compressive stresses in the filaments, which is undesirable.

The process according to the invention should be so carried out that in the metal sheets of the entire laminate there prevail preferably uniform compressive stresses. Said pre-stressing according to the invention is preferably conducted on a flat laminate.

The use in the pre-stressed laminate according to the invention of thermoplastic synthetic materials resistant to higher temperatures, such as PEI or PEEK, results in obtaining a construction material in sheet form that can even be used in cases where service temperatures of about 200° C. for PEI or about 250° C. for PEEK may occur for lengthy periods of time, even in combination with a high moisture content.

The invention also comprises a constructional component composed of the laminate according to the invention, particularly for use in a vehicle, spacecraft or aircraft.

It should be added that EP-A₁-0 237 095 describes a product of a totally different type, namely a multi-layer armour plate. Said armour plate at least comprises a ceramic outer layer and a joining sub-layer. Said sub-layer consists of a laminate of alternating metal sheets and fabrics of continuous reinforcing yarns impregnated with a synthetic material. Said synthetic material may be in the form of, for instance, a thermoplastics material.

Reference is also made to GB No. 2 178 364 A, which describes a special method of making laminates. These laminates are formed by metal outer sheets between which there is provided a matrix of a thermoplastics synthetic material, such as polysulphone, polyetheretherketone, reinforced with glass or carbon fibres.

Mention is also made of EP-A₁.0 050 855, which describes a prepreg comprising fabric of reinforcing fibres spun from aromatic polyamids and glass fibres. The fabric used is impregnated with a synthetic material, which may be a thermosetting resin. A plurality of such prepregs may be laminated and optionally be overlaid on both sides with metal foil.

BRIEF DESCRIPTION OF THE DRAWINGS

To illustrate the advantages of the laminate according to the invention a comparison is made in FIG. 1 between the fatigue performance of a non-prestressed laminate (not according to the invention) and two differently pre-stressed laminates according to the invention. The comparison was made employing test specimens of the shape drawn in FIG. 1, in which prior to the start of the test there was made a (sharp) saw cut 3 mm long. In FIG. 1 the half crack lengths are plotted in mm on the ordinate. On the abscissa is plotted the total number of cycles of the used sinusoidally varying tensile fatigue load at constant amplitude. The frequency of the varying load was 10 Hertz. The load varied from a maximum tensile stress $\sigma_{max} = 150$ MPa to a minimum tensile stress $\sigma_{min} = 0$. Accordingly, the fatigue load used is of the type $$R = \frac{\sigma_{min}}{\sigma_{max}} = 0$$

The fatigue performance of the non-pre-stressed laminate (not according to the invention) is depicted in FIG. 1 by the line indicated with 2P42-0%, i.e., 0% pre-stress or, in other words, a laminate not specially drawn again after cooling (elongation 0%). The fatigue performance of two prestressed laminate materials according to the invention is shown in FIG. 1 by the lines indicated with 2P42-0.42% and 2P42-0.48%. In the two lastmentioned materials according to the invention cooling is followed by applying an external tensile force to the laminate materials, such that a permanent elongation was brought about in them of 0.42 and 0.48%, respectively. After removal of this external force pre-stressed laminates were obtained; and in the metal sheets of the laminate in its externally entirely unloaded state there prevails a compressive stress in the prestress direction and in the filaments a tensile stress. As shown in FIG. 1, the non-pre-stressed laminate material will in any case be fractured below 50,000 load variations. The pre-stressed laminates according to the invention will not fracture yet at 50,000 load variations. Even after 250,000–300,000 load variations the laminate according to the invention will still be capable of carrying a load. On the basis of these comparative tests it may be concluded that the fatigue performance of the pre-stressed laminates according to the invention is far more favorable than that of the non-pre-stressed laminate. Except for the degree of pre-stress the three laminates for which the test results are given in FIG. 1 are identical in construction and composition. All three laminates are of the 2P42 type. This means that the laminates consist of two metal sheets 0.4 mm thick of aluminium-copper alloy of the AA(U.S.A.) No. 2042-T₃ type between which metal sheets there is provided a thermoplastic synthetic material reinforced with continuous or endless PPDT filaments. The PPDT filaments had a diameter of 12 μm. The thermoplastic synthetic material in the three laminates tested was Ultem ®, which is of polyetherimide (PEI). In the completed laminate the synthetic layer composed of a very large number of parallel or unidirectional filaments impregnated with the synthetic material of PEI had a total thickness of 0.23 mm.

In addition, measurements have shown that the internal stresses in said 3 tested types of externally unloaded laminates were as follows:

| Type of laminate | Stress in metal sheets of Al-alloy MPa | Stress in prepreg MPa |
|---|---|---|
| 2P42-0% not according to the invention | 62 tensile stress | 216 compressive stress |
| 2P42-0,42% pre-stressed according to the invention | 4 compressive stress | 14 tensile stress |
| 2P42-0,48% pre-stressed according to the invention | 13 compressive stress | 45 tensile stress |

These measurements were carried out after the removal by etching of one of the two aluminium sheets, after which the remaining laminate became warped. From this warped and partly dismantled laminate the above internal stresses in the complete (unwarped) flat laminate were derived.

Figure 2:
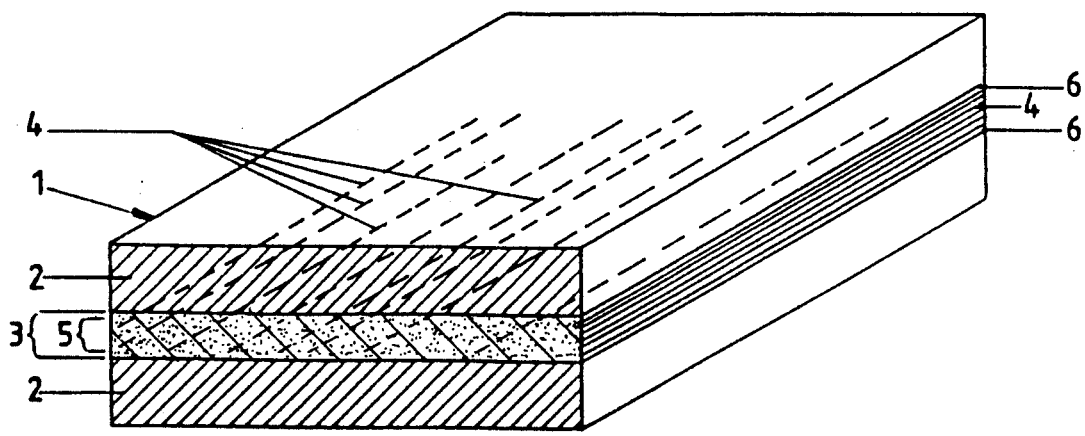
FIG. 2 is a schematic depiction of an embodiment of the laminate according to the invention.

FIG. 2 is a schematic depiction in perspective of an embodiment of the laminate according to the invention generally referred to by the numeral 1. The laminate 1 consists of two metal sheets 2 with in between them a prepreg 3 composed of a synthetic layer reinforced with a very large number of parallel or unidirectional threads or filaments 4 of poly-paraphenylene terephthalamide (PPDT). The synthetic layer 3 may be made of a core layer of plastics-impregnated filaments 5 and on either side of it a boundary layer 6 intimately attached to the metal sheets 2, the boundary layers containing virtually no filaments.

Figure 3:
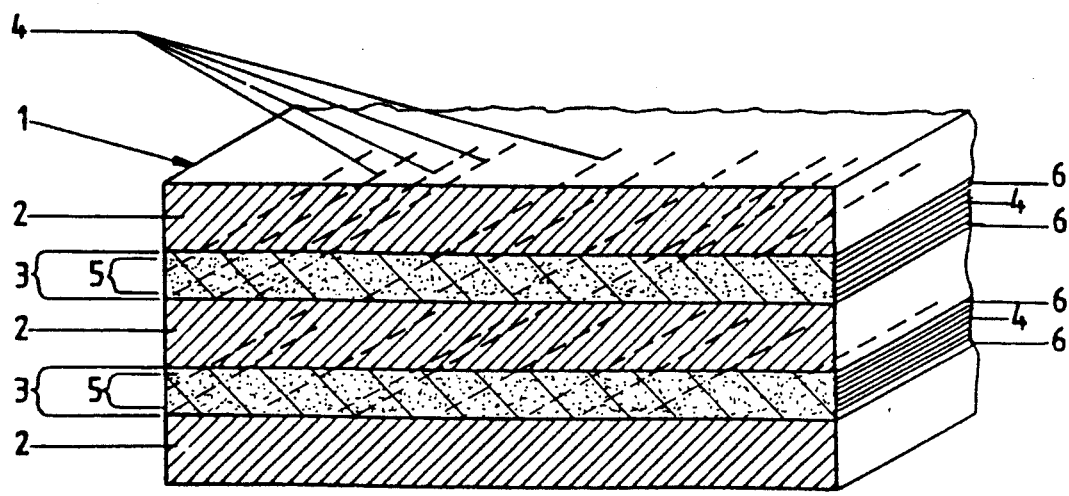
FIG. 3 is a cross-sectional view of a laminate according to the invention composed of three metal sheets.

FIG. 3 is a cross-sectional view of a laminate 1 according to the invention, which differs from the laminate according to FIG. 2 only in that it is composed of three metal sheets 2 with in between them two synthetic layers 3 reinforced with parallel PPDT filaments 4.

Figure 1:
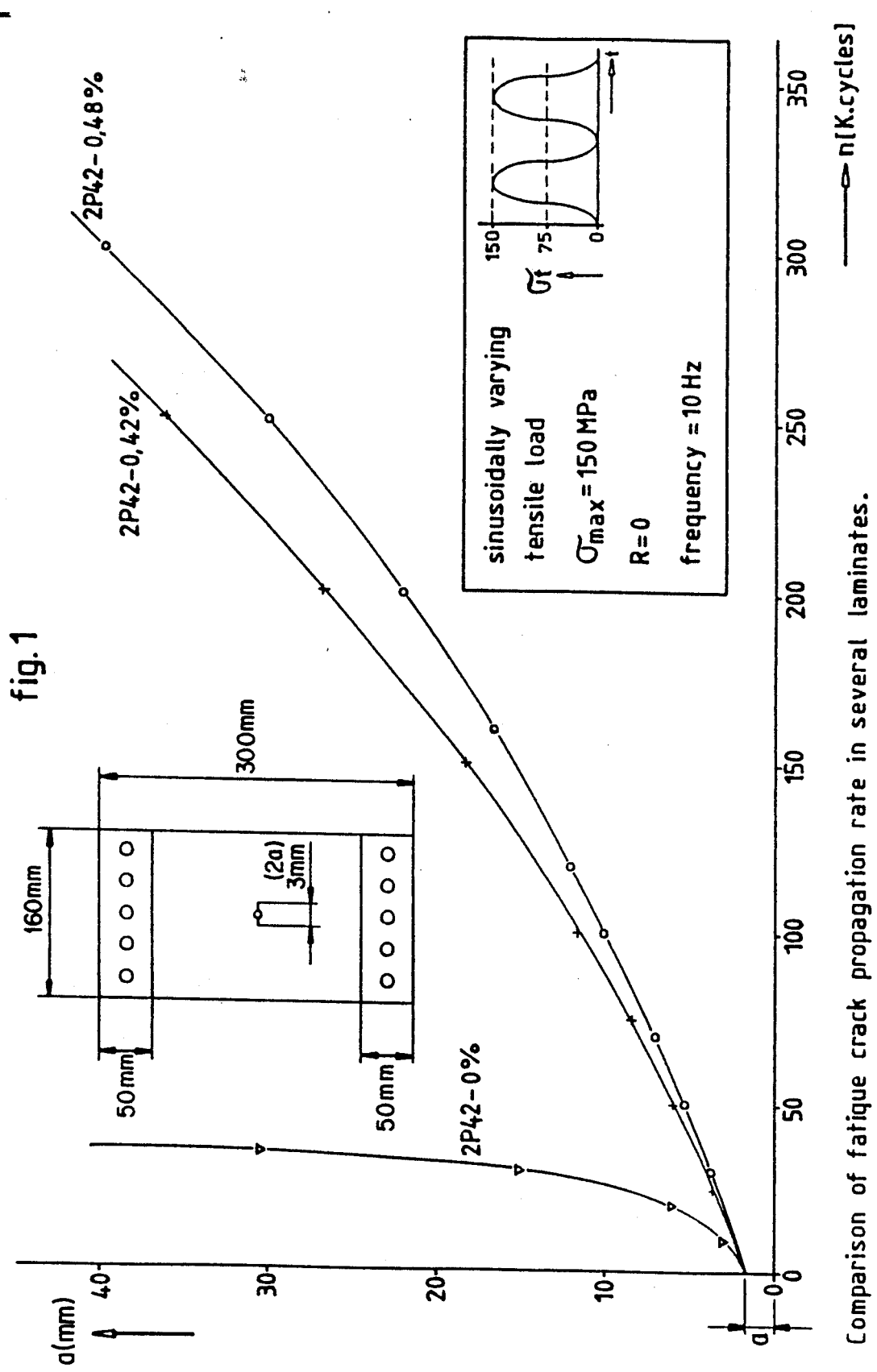
FIG. 1 illustrates the advantages a prestressed laminate according to the invention over a non-prestressed laminate.

The type of laminate according to the invention depicted in FIG. 2, for which the test results are represented in FIG. 1 by the lines 2P42-0.42% and 2P42-0.48%, was manufactured in the following way. Firstly, on a support two sheets of said aluminium-copper alloy were superimposed with interposition of said prepreg having a total thickness of 0.23 mm and being composed of a very large number of parallel (unidirectional) PPDT filaments having a diameter of 12 μm impregnated with thermoplastic synthetic material of said PEI.

The aluminium sheets and the prepreg were 210 mm wide and 300 mm long, with the filaments constituting 50% by volume of the total volume of synthetic material and filaments combined. The resulting package of loose parallel parts, viz. two metal sheets with in between them the prepreg, was fixed. Next, the package was heated for a few minutes in a hot press at a temperature of 230° C. without pressure being applied to the package.

Subsequently, the package was compressed at a pressure of 2–3 MPa over a period of 15–20 minutes. The package was then cooled to room temperature with the pressure being maintained, after which a laminate forming an integrated whole was obtained. As was mentioned in the explanation of FIG. 1, cooling was followed by applying an external tensile force to the laminate in its entirety in the longitudinal direction of the PPDT reinforcing filaments, such that in the laminate a permanent elongation was brought about. After the removal of this external tensile force prestressed laminates are obtained in which in the aluminium sheets of the laminate in its externally entirely unloaded state there prevails a compressive stress in the pre-stress direction and in the filaments a tensile stress when the laminate has a substantially flat shape.

By said aramid is meant here a synthetic polyamide in which at least 85% of the amide bonds is directly linked to two aromatic rings. As examples of such aramids may be mentioned poly-paraphenylene terephthalamide and copolyamide built up from p-phenylene diamine ester, 3,4'-diaminodiphenyl etherester, and terephthalic acid ester.

Before being attached to the prepreg, the metal sheets should of course be subjected to various appropriate pre-treatments, such as alkaline degreasing, etching in a chromic-sulphuric acid bath, anodizing in chromic acid or phosphoric acid, application of a primer having corrosion inhibiting properties or the like appropriate to the type of synthetic material used.

The term tenacity of the filaments used in the description invariably refers to the virgin tenacity at tensile load in the longitudinal direction of the filament and measured on a single filament containing no adhesives, i.e., a virgin filament, the measurements being carried out in accordance with ASTM No. D3379-75. The modulus of elasticity also has to be determined in accordance with ASTM No. 03379-75.

The aforementioned glass transition point $T_g$ of said substantially amorphous thermoplastic synthetic materials should be determined employing a dynamic mechanical measuring device of the RDA-700 type of the make Rheometrics, using a frequency of 1 Hertz and a heating rate of 2° C./min. at most. $T_g$ is the temperature at which there is a maximum damping modulus G.

The aforementioned crystalline melting point $T_m$ of the semi-crystalline thermoplastic synthetic materials is determined by Differential Scanning Calorimetry (DSC). This determination is carried out with the DSC-7 type measuring apparatus of Perkin Elmer at a heating rate of 20° C./min. Tm is defined here as the peak maximum of the endothermic peak in the DSC curve.

Within the scope of the invention various changes may be made. Although in the laminates according to the invention it is preferred that use be made of metal sheets having the same thickness, it is in principle also possible for one and the same laminate to contain metal sheets which have two or more different thicknesses and are arranged symmetrical or not. As a rule, the thickness of the synthetic layer between two successive metal sheets will be of approximately the same order of magnitude as that of each of the metal sheets. Optionally, the synthetic layers may contain some conventional additions such as fillers. The continuous reinforcement threads or filaments in the synthetic layers may extend parallel to each other in one direction, i.e., they may be arranged unidirectional. Alternatively, there may be applied two groups of reinforcing filaments. Each group will then comprise a very large number of parallel filaments, the threads or filaments of the one group extending at right angles to the filaments of the other group. Such an arrangement may for instance be realized by providing the filaments of the two groups in the form of a fabric. Although throughout the description reference is made to a laminate pre-stressed in one direction, the invention in principle also permits the manufacture of a laminate pre-stressed in two different directions intersecting each other for instance at right angles.

We claim:

1. A laminate composed of at least two metal sheets, between which is provided a synthetic thermoplastic layer containing fibers having a high modulus of elasticity of 60–450 Gpa, which layer is bonded to the metal sheets, wherein:
   A. the fibers consist essentially of continuous filaments extending parallel to each other in at least one direction;
   B. the metal sheets each have a thickness of less than 1.5 mm and are made of a metal having a tensile strength higher than 0.20 Gpa, said metal being selected from the group consisting of aluminum, aluminum alloys, aluminum-copper alloys, aluminum-zinc alloys, steel, titanium alloys, copper, copper alloys and magnesium alloys;
   C. the elongation at rupture of the filaments is higher than 0.5% and not more than 6%;
   D. the laminate is prestressed such that in the pre-stress direction in each metal sheet of the substantially flat laminate in its externally entirely unloaded state there prevails a compressive stress, and in the continuous filaments, a tensile stress;
   E. said compressive stress in the metal sheets is in the range of from 0 to 200 MPa and said tensile stress in the filaments is in the range of from 0 to 500 MPa; and
   F. the thermoplastic synthetic material is selected from the group consisting of substantially amorphous thermoplastic synthetic materials having a glass transition temperature $T_g$ above 140° and semi-crystalline or para-crystalline synthetic thermoplastic materials having a crystalline melting point $T_m$ above 270° C.

2. A laminate according to claim 1, characterized in that the synthetic layer is composed of one or more layers of plastics-impregnated filaments, said filament layers being provided on either side with a synthetic boundary layer contacted by the metal sheets and bonded thereto, which boundary layers contain virtually no filaments and have a thickness of 10–60 mm.

3. A laminate according to claim 1, characterized in that the filaments constitute 35–75% by volume of the total volume of synthetic material and filaments combined.

4. A laminate according to claim 1, characterized in that the modulus of elasticity of the filaments is 60-450 GPa.

5. A laminate according to claim 1, characterized in that the metal sheets each have a thickness of 0.1 mm-0.8 mm and the number of metal sheets is in the range of 2 to 20.

6. A laminate according to claim 1, characterized in that the synthetic material is an amorphous thermoplastic synthetic material having a glass transition temperature $T_g$ above 160° C.

7. A laminate according to claim 6, characterized in that the synthetic material is selected from the group consisting of polyarylate (PAR), polysulphone (PSO), polyethersulphone (PES), polyetherimide (PEI) and polyphenylene ether (PPE).

8. A laminate according to claim 7, characterized in that the synthetic material is poly-2,6 dimethyl phenyl ether.

9. A laminate according to claim 1, characterized in that the synthetic material is a semi-crystalline or paracrystalline thermoplastic synthetic material having a crystalline melting point $T_m$ above 270° C.

10. A laminate according to claim 9, characterized in that the synthetic material is selected from the group consisting of polyphenylene sulphide (PPS), polyamide-4,6 polyketone sulphide (PKS), polyether ketones and liquid crystal polymers.

11. A laminate according to claim 10, characterized in that the synthetic material is selected from the group consisting of polyether-ether ketone (PEEK), polyether ketone (PEK) and polyether ketone-ketone (PEKK).

12. A laminate according to claim 10, characterized in that the synthetic material is made from the monomers bisphenol terephthalic acid and hydrobenzoic acid.

13. A laminate according to claim 1, characterized in that the filaments consist of a high modulus material selected from the group consisting of aramids, glass, carbon and polyethylene.

14. A laminate according to claim 13, characterized in that the high modulus material is selected from the group consisting of polyparaphenylene terephthalamide (PPDT), E-glass and $s_2$ glass.

15. A laminate according to claim 1, characterized in that the fibers consist of continuous filaments of aramids or glass having a modulus of elasticity of 60 to 200 GPa and an elongation at rupture of 1.5-6%;
the metal sheets are made of an aluminum alloy and have a thickness of 0.1-0.8 mm; and
in that the pre-stress direction in each metal sheet of the laminate in its externally entirely unloaded state there prevails a compressive stress in the range of 0-200 MPa; and in the pre-stress direction in the aramid or glass filaments there prevails a tensile stress in the range of 0-500 MPa.

16. A laminate of claim 15, characterized in that the fibers consist of polyparaphenylene terephtalamide (PPDT) filaments.

17. A laminate of claim 15, characterized in that the synthetic thermoplastic material is selected from the group consisting of polyarylate (PAR), polysulphone (PSO), polyethersulphone (PES), polyetherimide (PEI) and polyphenylene ether (PPE).

18. A laminate of claim 15, characterized in that the synthetic thermoplastic material is selected from the group consisting of polyphenylene sulphide (PPS), polyether-ether ketone (PEEK), polyether ketone (PEK), polyether ketone-ketone (PEKK) and liquid crystal polymers.

* * * * *